US012620846B2

(12) United States Patent
Kometani et al.

(10) Patent No.: US 12,620,846 B2
(45) Date of Patent: May 5, 2026

(54) PERMANENT MAGNET-TYPE ROTARY ELECTRIC MACHINE

(71) Applicants: Mitsubishi Electric Corporation, Tokyo (JP); OSAKA UNIVERSITY, Osaka (JP)

(72) Inventors: Haruyuki Kometani, Tokyo (JP); Ryoji Miyatake, Tokyo (JP); Atsushi Yamamoto, Tokyo (JP); Noboru Niguchi, Osaka (JP); Katsuhiro Hirata, Osaka (JP); Hironori Suzuki, Osaka (JP); Takuya Ito, Osaka (JP)

(73) Assignees: MITSUBISHI ELECTRIC CORPORATION, Tokyo (JP); OSAKA UNIVERSITY, Suita (JP)

( * ) Notice: Subject to any disclaimer, the term of this patent is extended or adjusted under 35 U.S.C. 154(b) by 225 days.

(21) Appl. No.: 18/704,922

(22) PCT Filed: Nov. 18, 2021

(86) PCT No.: PCT/JP2021/042377
§ 371 (c)(1),
(2) Date: Apr. 26, 2024

(87) PCT Pub. No.: WO2023/089721
PCT Pub. Date: May 25, 2023

(65) Prior Publication Data
US 2024/0421643 A1     Dec. 19, 2024

(51) Int. Cl.
*H02K 1/16* (2006.01)
*H02K 1/17* (2006.01)
*H02K 16/02* (2006.01)

(52) U.S. Cl.
CPC ............... *H02K 1/165* (2013.01); *H02K 1/17* (2013.01); *H02K 16/02* (2013.01)

(58) Field of Classification Search
CPC ............ H02K 1/16; H02K 1/185; H02K 1/17; H02K 1/246; H02K 1/148; H02K 1/278
See application file for complete search history.

(56) References Cited

U.S. PATENT DOCUMENTS 4,758,756 A * 7/1988 Pouillange ............. H02K 19/18
310/152
10,014,738 B2 * 7/2018 Tojima ................. H02K 49/102
(Continued)

FOREIGN PATENT DOCUMENTS

DE    10 2019 133 580 A1    6/2021
JP       2016-135014 A    7/2016
(Continued)

OTHER PUBLICATIONS

Extended European Search Report issued Dec. 18, 2024 in European Patent Application No. 21964736.9, 11 pages.
(Continued)

*Primary Examiner* — Leda T Pham
(74) *Attorney, Agent, or Firm* — XSENSUS LLP

(57) ABSTRACT

A permanent magnet-type rotary electric machine comprises: a stator including: a stator core having a plurality of stator teeth formed circumferentially; stator coils arranged in the respective bottoms of a plurality of stator slots formed between the stator teeth and wound on the stator teeth in a concentrated winding manner; and stator magnets arranged near the respective openings of the plurality of stator slots, a first rotor having a plurality of pole pieces and disposed coaxially with the stator to face the stator magnets; and a second rotor having a plurality of permanent magnets and disposed coaxially with the first rotor to face the first rotor, wherein the circumferential width of stator teeth positioned between the adjacent two of the stator magnets is narrower than the circumferential width of the stator slots.

7 Claims, 9 Drawing Sheets

(56) References Cited

U.S. PATENT DOCUMENTS

| | | |
|---|---|---|
| 2016/0006304 A1 | 1/2016 | Tojima et al. |
| 2022/0052596 A1 | 2/2022 | Ukaji et al. |
| 2022/0416639 A1 | 12/2022 | Kometani et al. |
| 2023/0007990 A1 | 1/2023 | Kometani et al. |

FOREIGN PATENT DOCUMENTS

| | | |
|---|---|---|
| JP | 2021-151156 A | 9/2021 |
| WO | 2014/128985 A1 | 8/2014 |
| WO | 2020/174936 A1 | 9/2020 |
| WO | 2021/149128 A1 | 7/2021 |
| WO | 2021/149130 A1 | 7/2021 |

OTHER PUBLICATIONS

International Search Report and Written Opinion received for PCT Patent Application No. PCT/JP2021/042377, mailed on Feb. 8, 2022, 9 pages.

\* cited by examiner

FUNDAMENTAL WAVE COMPONENT OF MAGNETIC FLUX
FROM STATOR MAGNET

STATOR - TEETH – WIDTH / STATOR - TEETH – PITCH (%)
AT THE AIR GAP SURFACE

STATOR - TEETH ~ WIDTH / STATOR - TEETH ~ PITCH (%)
AT THE AIR GAP SURFACE

PERMANENT MAGNET-TYPE ROTARY ELECTRIC MACHINE

CROSS-REFERENCE TO RELATED APPLICATION

This application is based on PCT filing PCT/JP2021/042377, filed Nov. 18, 2021, the entire contents of which are incorporated herein by reference.

TECHNICAL FIELD

The present application relates to a permanent magnet-type rotary electric machine.

BACKGROUND ARTS

There has been a rotary electric machine that is capable of changing the rotation speed of the rotor with the stator and the rotors being in no contact with each other. For example, such a rotary electric machine that is a magnetic wave gear machine is disclosed in Patent Document 1. The magnetic wave gear machine disclosed in Patent Document 1 includes a stator, a first rotor that rotates at a low speed, and a second rotor that rotates at a high speed depending on a speed change ratio. The stator, the first rotor, and the second rotor are disposed about the rotation axis in this order from the outer circumference. The stator is provided with stator coils. The stator coils are for outputting generated electric power or for controlling generated torque.

According to the magnetic wave gear machine disclosed in Patent Document 1, since the speed of the second rotor can be changed with the first rotor and the second rotor being in no contact with the stator, a mechanical transmission is eliminated and maintenance loads for coping with mechanical wear and the like can be mitigated.

PRIOR ART DOCUMENT

Patent Documents

Patent Document 1: JP2016-135014A
Patent Document 2: WO2020-174936A

SUMMARY OF THE INVENTION

Problem that the Invention is to Solve

The rotary electric machine disclosed in Patent Document 1 has a plurality of stator slots in the stator, and the stator coils and stator magnets (permanent magnets) are accommodated in the respective stator slots. The stator magnets in the respective stator slots are magnetized in the same direction. The first rotor having a plurality of pole pieces arranged circumferentially is disposed near the inner circumference of the stator, and the second rotor having permanent magnets is disposed near the inner circumference of the first rotor. Expressing the number of stator slots (=the number of stator teeth) of the stator as $N_S$, the number of pole pieces of the first rotor as $N_L$, and the number of pole pairs of the second rotor as $N_H$, the following mathematical relationship is satisfied:

$$N_L = N_S + N_H.$$

In this case, the second rotor rotates at a speed $N_L/N_H$ times the first rotor.

In the rotary electric machine disclosed in Patent Document 1, however, the stator coils are wound on the stator in a distributed winding manner. Stator coils wound in a distributed winding manner, when the stator diameter is increased with increasing capacity, are reduced in workability. Hence, in a case of the capacity of the rotary electric machine being increased, workability of the stator coils is reduced. On the other hand, in a case of the stator coils wound in a concentrated winding manner, although the capacity is increased, reduction in workability of the stator coils is suppressed. For this reason, in order to suppress the reduction in workability of the stator coils, the stator coils of the rotary electric machine are preferably wound in a concentrated winding manner.

In a case of operating as a generator the rotary electric machine disclosed in Patent Document 1, when the first rotor is rotated by an external power, the magnetic force of the stator magnets and the magnetic force of the second rotor magnets are modulated by the plurality of pole pieces of the first rotor, whereby the second rotor is rotated at an increased speed. Linkage of magnetic force generated from the permanent magnets of the second rotor increased in speed with the stator coils induces a generated power in the stator coils. That is, increasing the rotation speed of the second rotor or linking more magnetic force of the permanent magnets of the second rotor with the stator coils by narrowing the air gaps from the second rotor to the stator increases induced voltage and results in increase of the generated power.

Input is generated by rotating the first rotor by an external power: (speed of the first rotor)×(torque acting on the first rotor). Since the torque is generated in the first rotor by modulation of the magnetic force from the stator magnets and the magnetic force from the permanent magnets of the second rotor by the pole pieces of the first rotor, in order to obtain a necessary output, the torque generated in the first rotor needs to be a predetermined value depending on the rotation speed. That is, by increasing the torque generated in the first rotor, the capacity can be increased.

Generally, considering a generator of large capacity of megawatt-class reveals that the machine size or the amount of permanent magnets to be used is affected not by induced electromotive force (hereinafter, referred to as induced voltage) proportional to magnetic flux generated from the second rotor that links with the above-mentioned stator coils and to the rotation speed of the second rotor, but significantly by the magnitude of torque generated in the first rotor. In other words, although the induced voltage is increased, reduction of the torque leads to increase of the machine size or the amount of permanent magnets to be used.

The magnetic geared motor disclosed in Patent Document 2 has the same structure as Patent Document 1, but the two circumferential right and left stator magnets accommodated in each of the stator slots are magnetized in the opposite directions. This allows the number $N_S$ of pole pairs formed by the stator magnets in each of the slots to be increased more than a case of magnetizing in the same direction, and by configuring the first rotor to have an appropriate number of pole pieces, the ratio of speed increase/decrease is increased and the induced voltage is increased when used as a generator. However, compared with a configuration of magnetizing in the same direction the stator magnets in each of the slots, the magnetic force generated by one stator magnet of the same volume as the magnets is decreased, thus posing a problem of reducing the torque.

The present application is made to resolve such the problem described above and is aimed at improving generated torque of a permanent magnet-type rotary electric machine that has stator coils configured in a concentrated winding manner and has stator magnets in the respective slots magnetized in the same direction.

Means for Solving the Problem

A permanent magnet-type rotary electric machine disclosed in the present application comprises: a stator including: a stator core having a plurality of stator teeth formed in a circumferential direction; stator coils arranged on respective bottom sides of a plurality of stator slots formed between the stator teeth and wound on the stator teeth in a concentrated winding manner; and stator magnets having the same polarity in a radial direction and arranged on respective opening sides of the plurality of stator slots, a first rotor having a plurality of pole pieces and disposed coaxially with the stator to face the stator magnets; and a second rotor having a plurality of permanent magnets and disposed coaxially with the first rotor to face the first rotor, wherein circumferential width of the stator teeth positioned between the stator magnets arranged in adjacent stator slots among the plurality of stator slots are narrower than circumferential width of the stator slots.

Advantageous Effect of the Invention

The permanent magnet-type rotary electric machine according to the present application has the stator coils configured in a concentrated winding manner and has stator magnets in the respective slots magnetized in the same direction, thus being able to improve the generated torque.

DETAILED DESCRIPTION OF THE INVENTION

Embodiment 1

Figure 1:
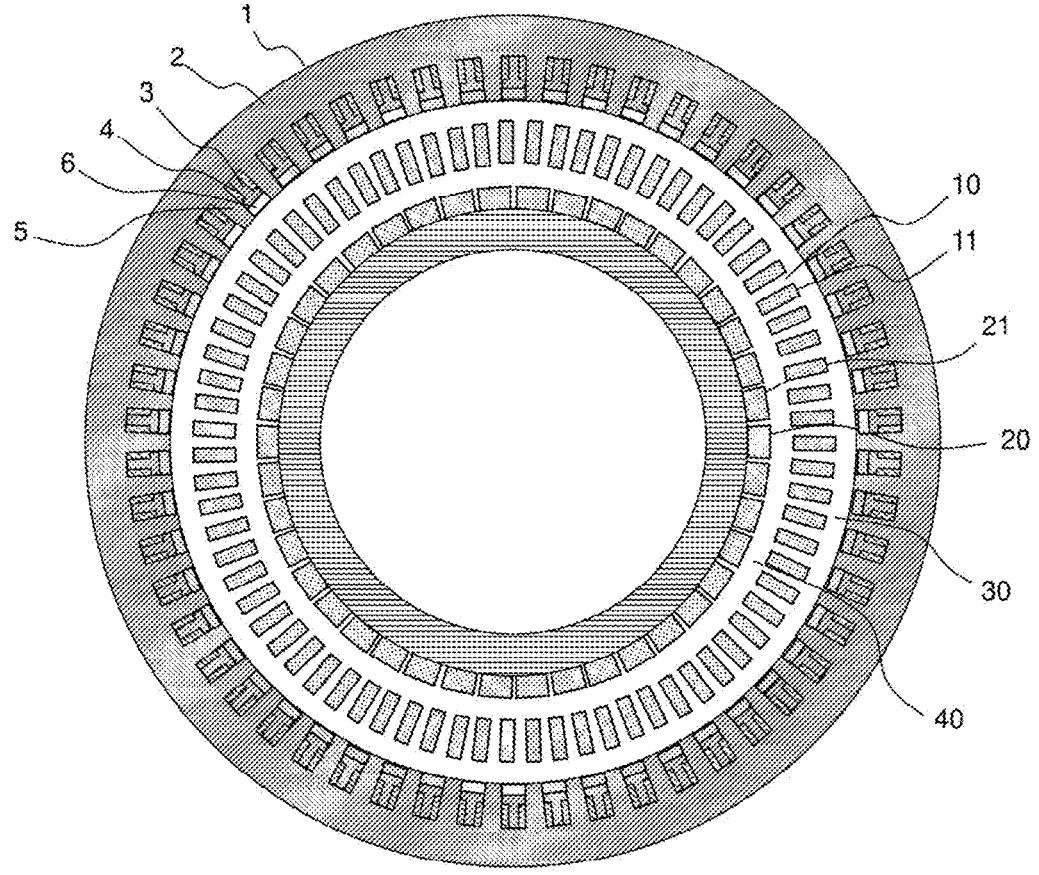
FIG. 1 is a cross-sectional view showing a whole basic structure of a permanent magnet-type rotary electric machine disclosed in the present application.

FIG. 1 is a cross-sectional view showing a basic structure of a permanent magnet-type rotary electric machine disclosed in the present application. The operation of the permanent magnetic-type rotary electric machine when used as a generator is described first using FIG. 1. Note that the rotary electric machine is described taking a generator as an example in the present application, but can also be applied to a case used as an electric motor.

Referring to FIG. 1, a stator 1 includes a stator core 2 having a plurality of stator slots 3 formed therein, and stator coils 4 are accommodated in the stator slots 3. The stator coils 4 are wound on the stator teeth 5 in a concentrated winding manner. Stator magnets 6 that are permanent magnets are accommodated in the stator slots 3, and all stator magnets 6 are magnetized to have the same pole of polarity in the radial direction. Hence, if the stator magnets 6 are N poles, the stator teeth 5 are S poles; $N_S$ pole pairs that are the same as the number of stator slots 3 are formed.

A first rotor 10 is disposed facing the stator 1 across an air gap and made up of a plurality of pole pieces 11 arranged circumferentially. The number of pole pieces is expressed as $N_L$. A second rotor 20 is disposed facing the first rotor 10 across an air gap. The second rotor 20 has second rotor magnets (permanent magnets) 21 and forms Nu pole pairs (the number of poles is $2 \times N_H$).

In this case, if $$N_L = N_S + N_H \qquad (1)$$

is satisfied, torque is generated in the first rotor 10 by magnetic interaction between the stator magnets 6 and the second rotor magnets 21, and rotating the first rotor 10 by an external power against the torque enables input to the first rotor 10 to be obtained.

If a stator current is passed through the stator coils 4 against the input to the first rotor 10 for the second rotor 20 to run freely, the second rotor 20 rotates at a speed $N_L/N_H$ times the first rotor 10. Since the second rotor 20 thus rotates at the speed $N_L/N_H$ times the first rotor 10, the permanent magnet-type rotary electric machine disclosed in the present application is referred to as permanent magnet-type rotary electric machine having a magnetic transmission mechanism. When the second rotor 20 rotates at the speed $N_L/N_H$ times the first rotor 10, an induced electromotive force can be generated in the stator coils 4 by linkage of magnetic flux generated from the second rotor magnets 21 with the stator coils 4, and connecting this to a load enables a generated power to be output from the stator coils 4.

In order to increase the generated power output of the permanent magnet-type rotary electric machine having the magnetic transmission mechanism, it can be seen that the induced voltage generated in the stator coils 4 at no load needs to be increased. In order to increase the induced voltage generated in the stator coils 4, it can be seen that a method of increasing the amount of linkage of magnetic flux generated from the second rotor magnets 21 with the stator coils 4 and increasing the frequency of the magnetic flux linking with the stator coils 4 are effective. Regarding the former, methods are conceivable that increases the volume of second rotor magnets to be used, narrows two air gaps (a first air gap 30 and a second air gap 40 across the first rotor 10) between the second rotor 20 and the stator 1, and so on. Regarding the latter, a design is conceivable that increases the speed increase ratio ($N_L/N_H$).

However, in the permanent magnet-type rotary electric machine having such the magnetic transmission mechanism, in order to increase the output, the input, i.e., the torque generated in the first rotor 10 needs to be increased. The torque generated in the first rotor 10 is almost independent of the current through the stator coils 4 but is generated by interaction of the magnetic flux from the stator magnets 6 and the magnetic flux from the second rotor magnets 21 with the pole pieces 11 of the first rotor 10. Hence, the size of the rotary electric machine or the volume of permanent magnets to be used that is necessary for such the permanent magnet-type rotary electric machine to obtain an output is determined by influence of both the magnitude of induced voltage and the magnitude of torque. Of course, it goes without saying that a rotary electric machine having a smaller size is excellent and a smaller volume of permanent magnets to be used is also excellent from the aspect of global environmental protection.

In the permanent magnet-type rotary electric machine disclosed in the present application having the magnetic transmission mechanism, assuming a large capacity of megawatt-class output, it is found that the size of the rotary electric machine or the volume of permanent magnets to be used depends more significantly on the magnitude of torque than the magnitude of induced voltage. That is, by increasing the torque, the size of the rotary electric machine of the present application is reduced and the volume of permanent magnets to be used can be reduced.

Embodiment 1

Figure 2:
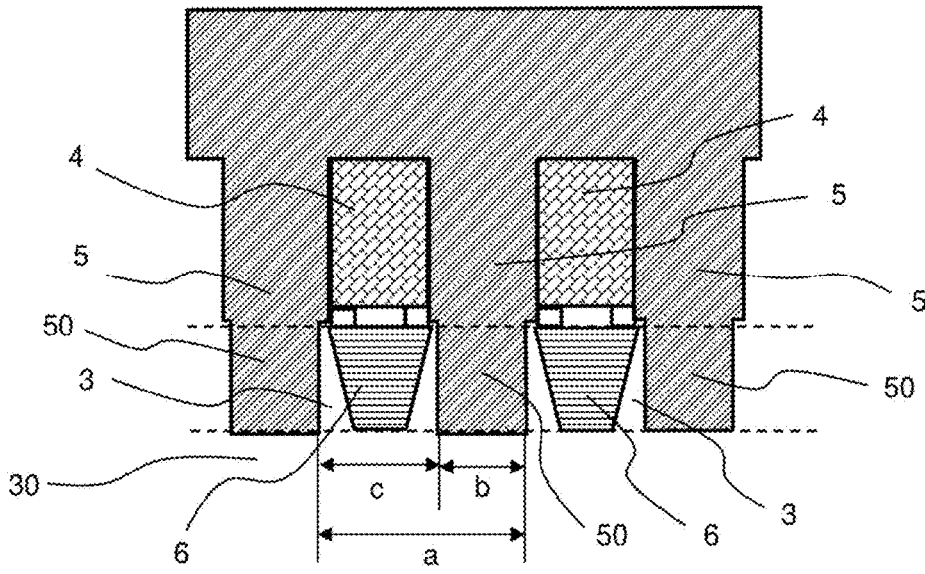
FIG. 2 is an enlarged conceptual view showing a cross-section near the stator teeth of the permanent magnet-type rotary electric machine according to Embodiment 1.

FIG. 2 is an enlarged conceptual view showing a cross-section near the stator teeth of the permanent magnet-type rotary electric machine according to Embodiment 1. FIG. 2 shows a portion including two of the stator slots 3. The stator coils 4 are accommodated in the stator slots 3 and wound on the stator teeth 5 in the concentrated winding manner. The stator magnets 6 are accommodated in the stator slots 3, and all stator magnets 6 in the respective slots are magnetized to have the same pole of polarity in the radial direction. The stator magnets 6 are arranged in the stator slots 3 nearer the first air gap 30 than the stator coils 4. A description is made below of a result of considering stator teeth 50 that are portions of the stator teeth 5 corresponding to portions where the stator magnets 6 are arranged, i.e., positioned between the respective stator magnets 6 accommodated in the adjacent stator slots 3 (positioned between the adjacent stator magnets 6) as shown in FIG. 2.

As shown in FIG. 2, the circumferential width of the stator teeth 50 positioned between the adjacent stator magnets 6 is expressed as b, the pitch of the stator teeth 5 at the portion facing the first air gap 30, i.e., at the air gap surface, as a, and the circumferential width of the stator slots 3, as c. It is noted that in Embodiment 1, all of the stator teeth 50 positioned between the adjacent stator magnets 6 have the same circumferential width. Expressing as b/a×100 [%] the ratio of the stator teeth width to the stator teeth pitch, the b/a×100 [%] is set to 50% or less in Embodiment 1, i.e., the circumferential width of the stator teeth 50 positioned between the adjacent stator magnets 6 is set narrower than the circumferential width c of the stator slots.

Figure 3:
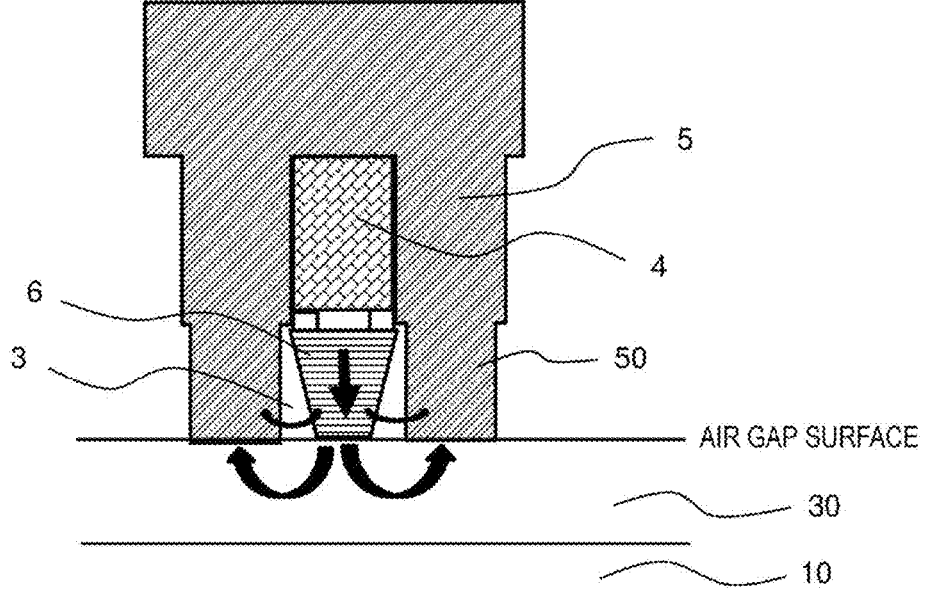
FIG. 3 is a cross-sectional view schematically showing magnetic flux generated from the stator magnets of the permanent magnet-type rotary electric machine according to Embodiment 1.

FIG. 3 is a diagram schematically showing magnetic flux generated from the stator magnets 6 magnetized in the direction of the straight arrow. Magnetic flux generated from the stator magnets 6 that reaches the pole pieces 11 of the first rotor 10 through the first air gap 30 is effective magnetic flux contributing to the torque. However, in actuality magnetic flux generated from the stator magnets 6 reaching the stator teeth 5 through the circumferentially neighboring spaces as shown by the thin curved arrows in the figure is leakage magnetic flux not contributing to the torque. Moreover, even in the first air gap 30, magnetic flux generated from the stator magnets 6 leaks to the stator teeth 5 as shown by the thick curved arrows before reaches the pole pieces 11 of the rotor 10.

In such the permanent magnet-type rotary electric machine of the present application having the magnetic transmission mechanism, since the first rotor 10 is the structure having the plurality of pole pieces 11, the permeance coefficient of the stator magnets 6 tends to be low compared to a general permanent magnet-type rotary electric machine. That is, there is a problem in that a fairly amount of the magnetic flux generated from the stator magnets 6 leaks to the stator teeth 5 through the paths as illustrated in FIG. 3. This causes reduction of the torque. It can be seen that in order to reduce the leakage magnetic flux, it is desirable to widen the distance between the stator magnets 6 and the stator teeth 50 positioned between the stator magnets 6.

Figure 4:
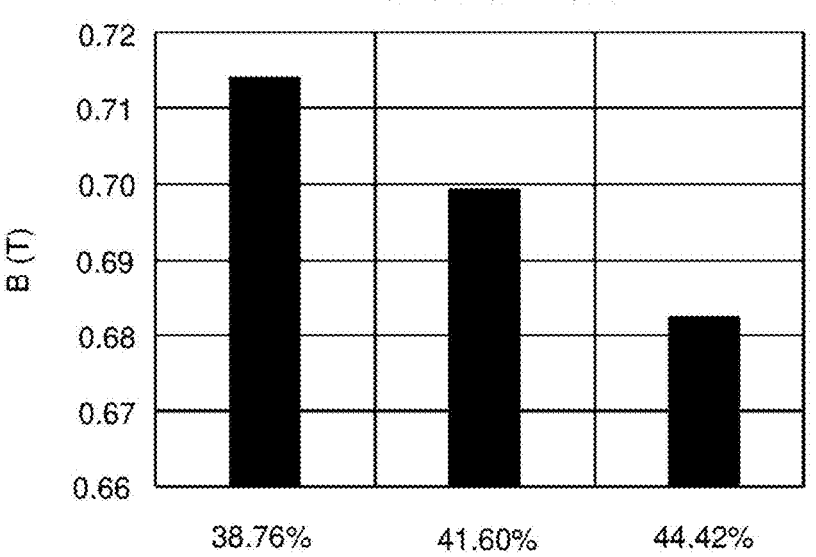
FIG. 4 is a graph showing results of analyzing the magnetic flux generated from the stator magnets of the permanent magnet-type rotary electric machine according to Embodiment 1.

Results of an electromagnetic analysis of density of the magnetic flux from the stator magnets 6 at the surface of the first air gap 30 of the first rotor 10 are shown in FIG. 4 with respect to the stator-teeth-width/stator-teeth-pitch at the air gap surface. FIG. 4 shows results of analyzing the fundamental wave component of the magnetic flux from the stator magnets. The larger the magnetic flux of the fundamental wave component, the more the effective magnetic flux contributing the torque. It can be seen from FIG. 4 that even though the volume of magnets is the same, the stator teeth 5 having a narrower width increases effective magnetic flux contributing to the torque.

Figure 5:
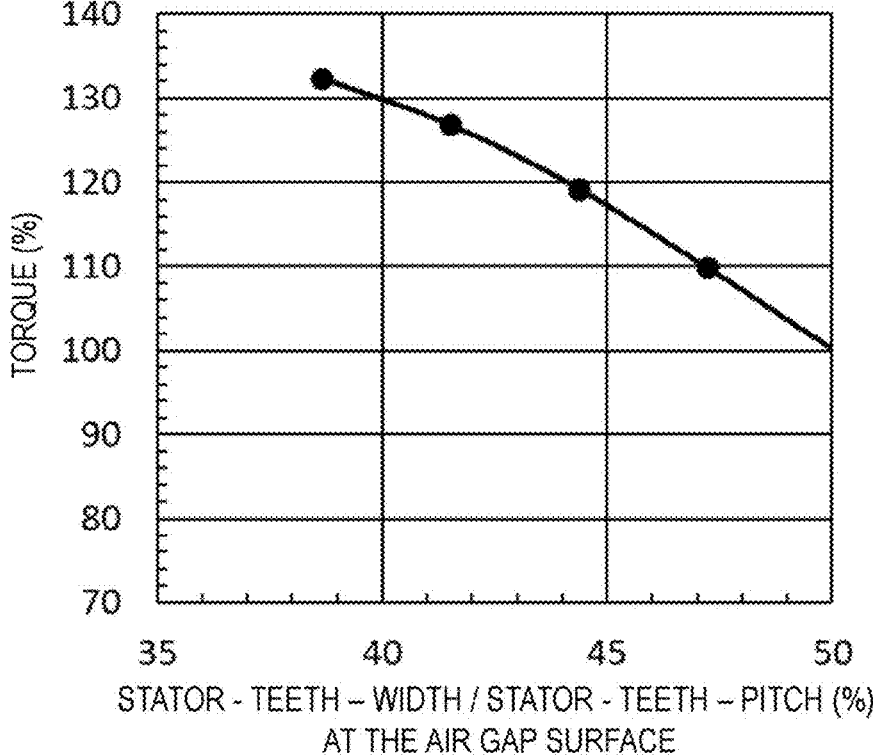
FIG. 5 is a line graph showing results of analyzing the torque of the permanent magnet-type rotary electric machine according to Embodiment 1.

Results of an electromagnetic analysis of the torque are in FIG. 5 with respect shown stator-teeth-width/stator-teeth-pitch at the air gap surface of the stator teeth 5. FIG. 5 is a line graph showing the analysis results with varying the width of the stator teeth and with the same stator magnets 6 by setting to 100% the torque in a case of the stator-teeth-width/stator-teeth-pitch being 50%. It can be seen from the same figure that a narrower width of the stator teeth 50 positioned between the stator magnets 6 improves the torque. In other words, by narrowing the width of the stator teeth 50 positioned between the adjacent stator magnets 6 than the circumferential width of the stator slots 3, the torque can be improved with the same volume of permanent magnets used and the same machine size, thus being able to contribute to miniaturization of the machine.

Embodiment 2

Figure 6:
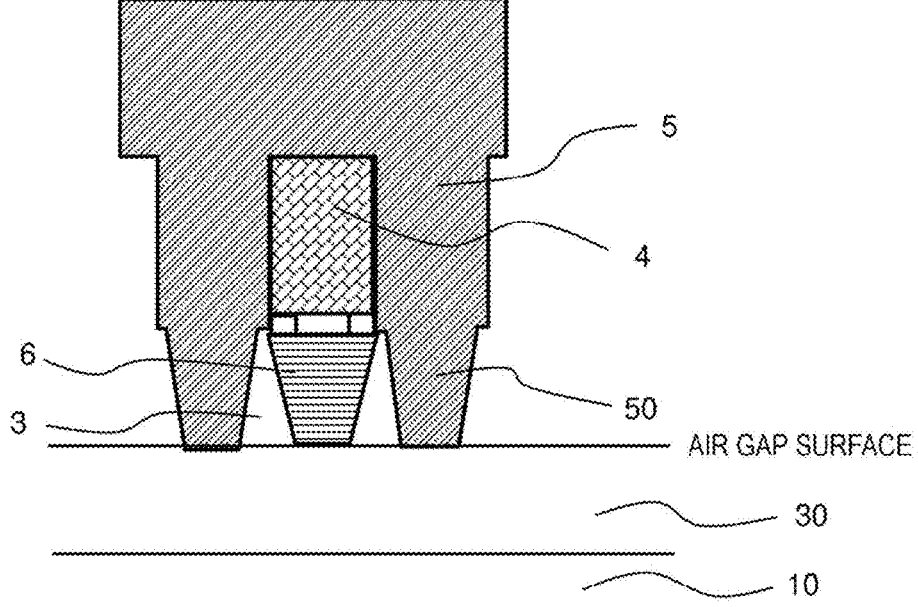
FIG. 6 is an enlarged conceptual view showing a cross-sectional view near the stator teeth of the permanent magnet-type rotary electric machine according to Embodiment 2.

FIG. 6 is an enlarged conceptual view showing a cross-sectional view near the stator teeth of the permanent magnet-type rotary electric machine according to Embodiment 2. The stator coils 4 are accommodated in the stator slots 3 and wound on the stator teeth 5 in the concentrated winding manner. The stator magnets 6 are accommodated in the stator slots 3 and all stator magnets 6 in the slots are magnetized to have the same pole of polarity in the radial direction. The stator magnets 6 are arranged nearer the first air gap 30 than the stator coils 4.

The width of the stator slots 3 between the stator teeth 50 positioned between the adjacent stator magnets 6 gradually increase toward the air gaps, and the stator slot width at least at the air gap surface is narrower than the width of the slot openings. However, the circumferential width at the outermost circumference, i.e., near the bottoms of the stator slots, of the stator teeth 50 positioned between the adjacent stator magnets 6 is preferably narrower than the width of the stator slots 3 at the same radial position.

Figure 7:
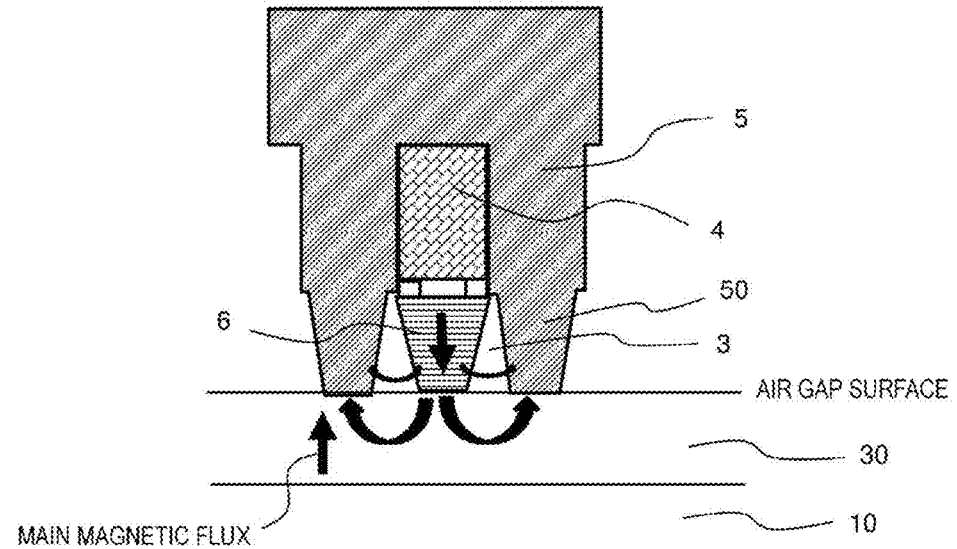
FIG. 7 is a cross-sectional view schematically showing magnetic flux generated from the stator magnets of the permanent magnet-type rotary electric machine according to Embodiment 2.

In the description of Embodiment 1, it was shown that the torque is improved by narrowing the width of the stator teeth than the width of the stator slots. As shown in FIG. 7, magnetic flux generated from the stator magnets that passes in the stator teeth 50 positioned between the adjacent stator magnets 6 is superimposes on the magnetic flux (main magnetic flux) from the second rotor magnets 21. For that reason, the stator teeth 50 positioned between the adjacent stator magnets 6 are likely to cause magnetic saturation, thus posing a problem in that the narrower the width of the stator teeth (the wider the width of the stator slots), the more decreases the induced voltage obtained by linkage of the magnetic flux from the second rotor 20 with the stator coils due to the magnetic saturation in the stator teeth 5.

Tapering in width the stator teeth 50 positioned between the adjacent stator magnets 6 toward the air gap as a configuration for mitigating the magnetic flux saturation in the stator teeth 50 positioned between the adjacent stator magnets 6 and for reducing leakage of the magnetic flux from the stator magnets 6 allows for increasing the cross-sectional area of the stator teeth 5 at the opposite side of the air gaps (near the stator coils), of the stator magnets 6, thereby being able to mitigate the magnetic saturation. Thus, the leakage magnetic flux can be reduced while mitigating decrease of the induced voltage, whereby the torque can be increased.

Figure 8:
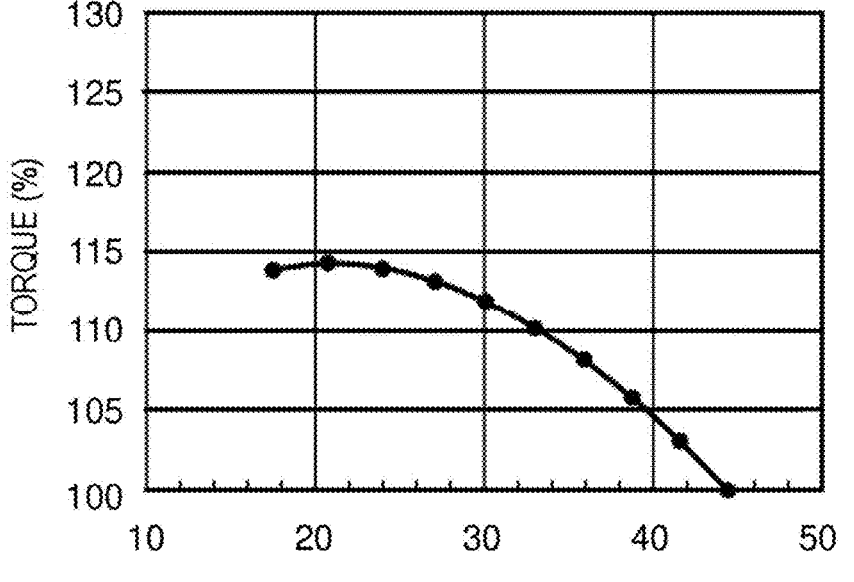
FIG. 8 is a line graph showing results of analyzing the torque of the permanent magnet-type rotary electric machine according to Embodiment 2.

Results of the electromagnetic analysis for the stator teeth 50 shaped tapered in width toward the inner circumference are shown in FIG. 8. FIG. 8 shows the torque in a case of varying the stator teeth width at the air gap surface, with the width at the position nearest the stator coils 4, of the stator teeth among the width of the stator teeth 50 positioned between the adjacent the stator magnets being fixed to 44.5% of the stator teeth pitch and with the same stator magnets 6. FIG. 8 is shown by setting to 100% the torque in the case of the width throughout the radial direction of the stator teeth 50 positioned between the adjacent stator magnets being 44.5% of the stator teeth pitch. It can be seen from the same figure that the torque is improved while mitigating influence of magnetic saturation in the stator teeth as much as possible. In other words, it can be seen that widening gradually toward the air gap surface the stator slot width between the stator teeth 50 positioned between the adjacent stator magnets improves the torque, thus being able to reduce the volume of permanent magnets to be used and the machine size.

Figure 9:
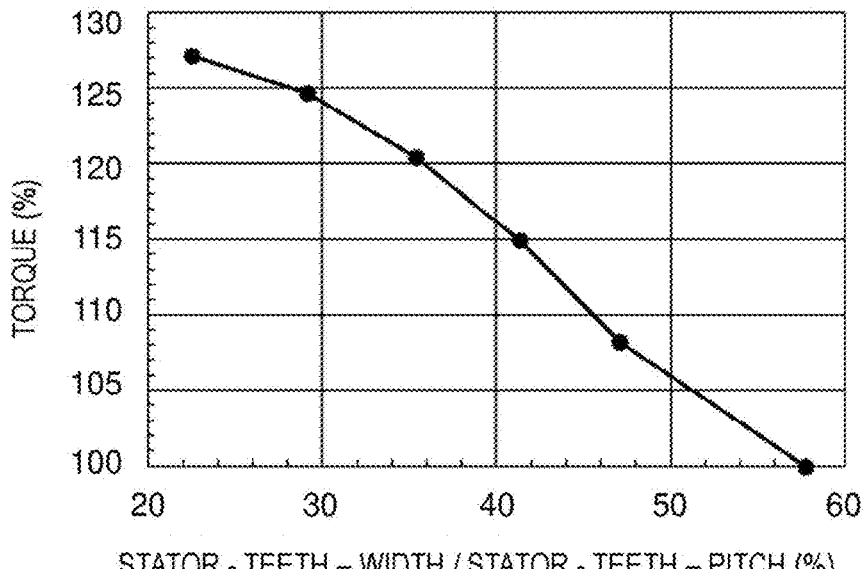
FIG. 9 is a line graph showing results of analyzing the torque of another configured permanent magnet-type rotary electric machine according to Embodiment 2.

The circumferential width at the nearest (the outermost circumference of) the stator coils 4, of the stator teeth 50 positioned between the adjacent stator magnets is preferably, but not limited to, narrower than the circumferential width at the same radial position, of the stator slots, i.e., less than 50% of the stator teeth pitch. Results of the electromagnetic analysis of the torque for the stator teeth 50 having the shape tapered in width toward the inner circumference are shown in FIG. 9 in a case of varying the stator teeth width at the air gap surface, with the width at the position nearest the stator coils 4, of the stator teeth among the width of the stator teeth 50 positioned between the adjacent the stator magnets being fixed to 57.7% of the stator teeth pitch and with the same stator magnets 6. FIG. 9 is shown by setting to 100% the torque in the case of the width throughout the radial direction of the stator teeth 50 positioned between the adjacent stator magnets being 57.7% of the stator teeth pitch. It can be seen from the same figure that even though the stator-teeth circumferential width at the position nearest the stator coils 4 among the positions between the adjacent stator magnets is 50% or more of the stator pitch (in other words, although the circumferential width nearest the stator coils 4, of the stator teeth 50 positioned between the stator magnets is wider than the stator-slot circumferential width at the same radial position), the same effect is brought about.

Embodiment 3

As shown in FIG. 2 and FIG. 6, the stator magnets 6 are formed to have width so as to be away from the stator teeth toward the air gaps, in other words, the stator magnets 6 are shaped tapered in circumferential width toward the inner circumference, whereby the distance between the stator magnets 6 and the stator teeth 50 positioned between the adjacent stator magnets can be further increased, thus improving the torque.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

REFERENCE NUMERALS

1: stator;
2: stator core;
3: stator slots;
4: stator coils;
5: stator teeth;
6: stator magnets;
10: first rotor;
11: pole pieces;
20: second rotor;
21: second rotor magnets (permanent magnets); and
50: stator teeth positioned between adjacent stator magnets.

The invention claimed is:
1. A permanent magnet-type rotary electric machine comprising:
  a stator including:
    a stator core having a plurality of stator teeth formed in a circumferential direction;
    stator coils arranged on respective bottom sides of a plurality of stator slots formed between the stator teeth and wound on the stator teeth in a concentrated winding manner; and
    stator magnets having the same polarity in a radial direction and arranged on respective opening sides of the plurality of stator slots,
  a first rotor having a plurality of pole pieces and disposed coaxially with the stator to face the stator magnets; and a second rotor having a plurality of permanent magnets and disposed coaxially with the first rotor to face the first rotor, wherein circumferential width of the stator teeth positioned between the stator magnets arranged in adjacent stator slots among the plurality of stator slots are narrower than circumferential width of the stator slots, and wherein the stator teeth and the stator magnets are interspaced from each other, and circumferential interspace width is gradually increased toward an inner circumference.

2. A permanent magnet-type rotary electric machine comprising:

a stator including:

a stator core having a plurality of stator teeth formed in a circumferential direction;

stator coils arranged on respective bottom sides of a plurality of stator slots formed between the stator teeth and wound on the stator teeth in a concentrated winding manner; and stator magnets having the same polarity in a radial direction and arranged on respective opening sides of the plurality of stator slots, a first rotor having a plurality of pole pieces and disposed coaxially with the stator to face the stator magnets; and a second rotor having a plurality of permanent magnets and disposed coaxially with the first rotor to face the first rotor, wherein at a position facing the first rotor, a circumferential width of the stator teeth are narrower than a circumferential width of the stator slots, wherein the stator teeth positioned between the stator magnets arranged in adjacent stator slots among the plurality of the stator slots are tapered in circumferential width toward an inner circumference, and wherein the stator teeth and the stator magnets are interspaced from each other, and circumferential interspace width is gradually increased toward an inner circumference.

3. The permanent magnet-type rotary electric machine of claim 2, wherein a circumferential width at an outermost circumference, of the stator teeth positioned between the stator magnets is wider than a circumferential width at the same radial position, of the stator slots.

4. The permanent magnet-type rotary electric machine of claim 1, wherein the stator magnets are tapered in circumferential width toward an inner circumference.

5. The permanent magnet-type rotary electric machine of claim 1, wherein the number $N_S$ of stator slots of the stator, the number $N_L$ of pole pieces of the first rotor, and the number $N_H$ of pole pairs of the second rotor satisfy $N_L=N_S+N_H$.

6. The permanent magnet-type rotary electric machine of claim 2, wherein the stator magnets are tapered in circumferential width toward an inner circumference.

7. The permanent magnet-type rotary electric machine of claim 2, wherein the number $N_S$ of stator slots of the stator, the number $N_L$ of pole pieces of the first rotor, and the number $N_H$ of pole pairs of the second rotor satisfy $N_L=N_S+N_H$.

* * * * *